United States Patent [19]

Kerko et al.

[11] 4,076,544

[45] Feb. 28, 1978

[54] COPPER-CADMIUM-SILVER PHOTOCHROMIC GLASS

[75] Inventors: David J. Kerko; Paul A. Tick, both of Corning, N.Y.

[73] Assignee: Corning Glass Works, Corning, N.Y.

[21] Appl. No.: 709,320

[22] Filed: Jul. 28, 1976

[51] Int. Cl.$^2$ .......................... C03C 3/04; C03C 3/08; C03C 3/26

[52] U.S. Cl. ...................................... 106/54; 106/52; 106/DIG. 6; 252/300

[58] Field of Search ...................... 106/54, DIG. 6, 52

[56] References Cited

U.S. PATENT DOCUMENTS

| | | | |
|---|---|---|---|
| 3,208,860 | 9/1965 | Armistead et al. | 106/54 |
| 3,325,299 | 6/1967 | Araujo | 106/DIG. 6 |
| 3,328,182 | 6/1967 | Araujo et al. | 106/54 |
| 3,615,771 | 10/1971 | Meiling | 106/54 |
| 3,703,388 | 11/1972 | Araujo et al. | 106/DIG. 6 |
| 3,875,321 | 4/1975 | Gliemeroth | 106/DIG. 6 |
| 3,902,909 | 9/1975 | Gliemeroth | 106/DIG. 6 |
| 3,950,591 | 4/1976 | Gliemeroth | 106/DIG. 6 |
| 3,954,485 | 5/1976 | Seward et al. | 106/DIG. 6 |

*Primary Examiner*—Helen M. McCarthy
*Attorney, Agent, or Firm*—Kees van der Sterre; Clinton S. Janes, Jr.; Clarence R. Patty, Jr.

[57] ABSTRACT

Copper, cadmium, silver and halogen-containing glass compositions suitable for the production of photochromic glass articles comprising these constituents in a separated, particulate photochromic phase are described. The glasses exhibit a characteristic copper-cadmium halide absorption inflection in the near ultraviolet, and are surface-darkenable on exposure to ultraviolet and short-wavelength visible light. However, they also exhibit optical bleaching characteristics and a variety of dark-state colors not previously obtained in surface darkening glasses.

3 Claims, 3 Drawing Figures

COPPER-CADMIUM-SILVER PHOTOCHROMIC GLASS

BACKGROUND OF THE INVENTION

U.S. Pat. No. 3,208,860, the basic patent in the field of photochromic glass, provides a general discussion of the theoretical concepts underlying the phenomenon of photochromism in glass (formerly termed phototropism), as well as the practical considerations which must be observed in producing such glass. As illustrative of the phenomenon, the patent provides exemplary compositions of inorganic silicate glasses which contain submicroscopic crystals of at least one of the silver halides, viz., silver chloride, silver bromide, or silver iodide. When subjected to actinic radiation, customarily ultraviolet radiation, the crystals become darker in color, thereby decreasing the optical transmission of the glass. However, when the actinic radiation is removed, the crystals return to their original state and the optical transmission of the glass is restored.

It is postulated that a reaction occurs between the actinic radiation and the crystals dispersed within the glassy matrix which, in some manner, alters the absorptive characteristics of the crystals to visible light. Unlike the normal photographic film, glass is inert and impermeable. Therefore, when the impingement of actinic radiation on the glass is halted, the crystals are permitted to return to their original state, since the reaction products resulting from the exposure of the crystals to actinic radiation cannot diffuse away from the site of the reaction. This circumstance allows the transmission of such glass to visible light to be reversibly varied ad infinitum.

U.S. Pat. No. 3,325,299 discloses the production of photochromic glass from inorganic glass compositions comprising copper, cadmium, and a halogen selected from the group consisting of chlorine, bromine, and iodine as essential components. The photochromically-active constituent of these glasses is a copper-cadmium halide phase which darkens on exposure to 300-550 mm radiation and fades in the absence thereof.

Glasses of the type described in U.S. Pat. No. 3,325,299 offer certain advantages over photochromic glasses of the silver halide type, principally with respect to batch cost and photochromic behavior. The darkening of these glasses is more proportional to the intensity of incident light and less dependent upon temperature than is the case with silver halide glasses. Also, these glasses tend to darken only in a relatively thin surface layer of the exposed glass, thus exhibiting high darkened optical density even in thin cross-section.

Unfortunately, photochromic glasses of the copper-cadmium halide type also suffer certain disadvantages, especially with respect to the color and bleaching characteristics of the glass. Thus these glasses in general exhibit only greenish coloration in the darkened state, and are not usually bleachable to the clear state by exposure to long wave-length visible light. These factors demonstrate the clear distinctions which exist between the coloration mechanisms and the photochromic response characteristics of these two different types of photochromic glasses.

U.S. Pat. No. 3,328,182 discloses silver halide photochromic glasses wherein cadmium oxide is added to the composition to improve the fading characteristics of the glass. Although it was found that minor amounts of this additive were effective to obtain accelerated fading, larger additions appeared to retard the fading rate and therefore were specifically discouraged. Aside from an improved thermal fading rate, it does not appear that these glasses exhibited photochromic properties substantially different from other silver halide-containing photochromic glasses.

SUMMARY OF THE INVENTION

We have now discovered photochromic glass compositions exhibiting rapid thermal fading and rapid surface darkening in combination with susceptibility to both optical bleaching and the development of a variety of colors in the darkened state. These compositions may be broadly characterized as silicate glasses comprising a silver-copper-cadmium halide photochromic phase.

Specifically our invention includes a photochromic glass article comprising a body of a silicate glass containing a photochromic phase which includes copper, cadmium, silver and at least one halogen selected from the group consisting of chlorine, bromine and iodine as essential constituents. The composition for the glass must include, in weight percent, as calculated from the batch at least about 0.01% Ag, 0.03% CuO, 0.4% CdO and 0.3% total of halogens selected from the group consisting of Cl, Br and I.

Due to the small size of the separated particulate phase in most photochromic glasses, phase composition cannot readily be ascertained by direct chemical analysis. However the presence of silver, copper and halogens in the photochromic phase of the present glasses is suggested by the darkened color of the glass and by the fact that the glass is optically bleachable. The hole trapping responsible for good photochromic response in the glass is attributed specifically to the copper constituent of the separated phase. Also, unlike the silver halide photochromic glasses, the glasses of our invention exhibit a characteristic ultraviolet absorption inflection at about 370 nm, typically an absorption peak, which is ascribed to the presence of copper in a $CdCl_2$ environment in the glass. A similar absorption peak is exhibited by silver-free copper-cadmium halide photochromic glass.

The fact that a phase separation is required to develop photochromic properties in accordance with our invention dictates a preferred range of base glass composition wherein good photochromism may be induced by conventional heat treatments. Such preferred glass compositions consist essentially, in weight percent on the oxide basis, as calculated from the batch of about 40-75% $SiO_2$, 4-26% $Al_2O_3$, 4-26% $B_2O_3$, 2-30% total of at least one alkali metal oxide selected in amounts not exceeding the indicated proportions from the group consisting of up to 8% $Li_2O$, up to 15% $Na_2O$, up to 20% $K_2O$, up to 25% $Rb_2O$ and up to 30% $Cs_2O$, 0.03-0.7% CuO, 0.4-5% CdO, 0.03-0.7% Ag, 0-2% F, and 0.3-3% total of halogens selected from the group consisting of Cl, Br and I. Of course, other conventional glassmaking oxides or constituents, such as MgO, PbO, $WO_3$, $Ta_2O_5$, $La_2O_3$, $P_2O_5$, $TiO_2$, $ZrO_2$ and the like, may also be present in minor amounts provided that they do not deleteriously affect the unique and characteristic photochromic properties of the glass.

DESCRIPTION OF THE DRAWINGS

The invention may be further understood by reference to the appended drawings, wherein.

DETAILED DESCRIPTION

Figure 1:
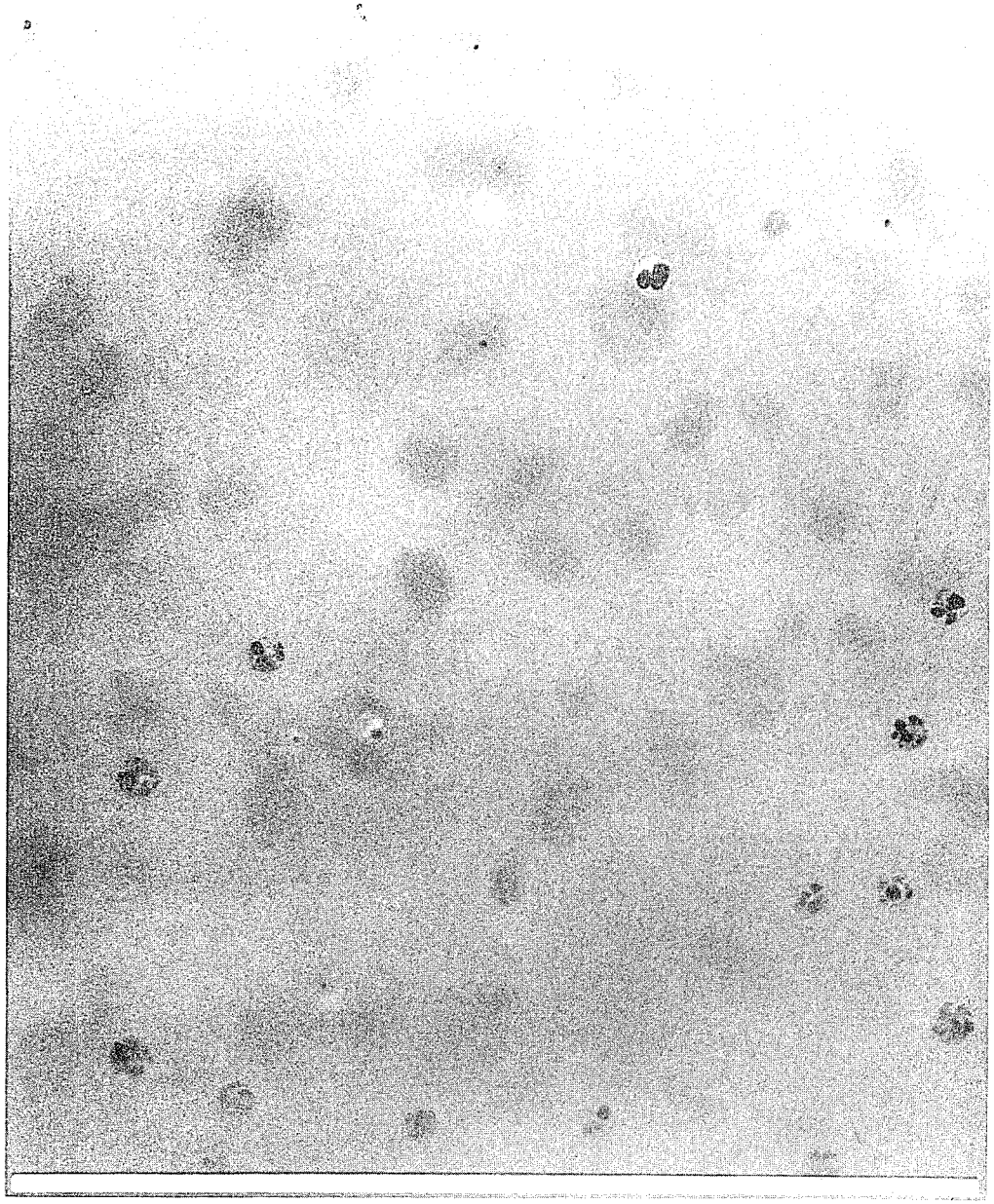
FIG. 1 is a transmission electron photomicrograph through a thin region of a fractured edge portion of a glass article provided in accordance with the invention, the white bar corresponding to a length of 1 micron.

Glass articles may be formed within the above-described composition range by compounding glass batches from conventional glass batch constituents in proportions calculated to yield the required components in the specified concentrations at the temperatures utilized for melting the batch. Adjustments to the batch composition should of course be made to allow for the possible loss of copper, cadmium, silver and the halogens through volatilization during melting. These losses may range up to about 50% for copper, 75% for cadmium, 80% for silver, and 90% for the halogens if no precautions to reduce loss are taken. However, the actual losses may be much less, depending upon melting conditions and upon the particular type of melting apparatus employed.

The glass batches may be melted in pots, tanks, crucibles or other conventional melting units at temperatures in the range of about 1200°–1550° C., and thereafter formed into glass articles by pressing, rolling, spinning, drawing or other conventional forming techniques. The shaped glass product may not be photochromic as formed, and, in that event, a further heat treatment at a temperature between the annealing point and softening point of the glass may be utilized to produce phase separation which imparts good photochromic properties to the glass. Suitable heat treatments may comprise exposing the glass to a temperature in the range of about 500°–900° C. for a time in the range of about 5 minutes to 24 hours.

Table I below sets forth glass compositions representing specific embodiments of the invention. The compositions are reported in parts by weight on the oxide basis, except for silver and the halogens which are reported on an elemental basis in accordance with conventional practice.

TABLE I

|  | 1 | 2 | 3 | 4 | 5 | 6 | 7 |
|---|---|---|---|---|---|---|---|
| $SiO_2$ | 60.1 | 58.7 | 54.6 | 55.4 | 55.5 | 60.1 | 54.5 |
| $Al_2O_3$ | 9.5 | 9.0 | 9.1 | 9.3 | 9.2 | 9.5 | 8.1 |
| $B_2O_3$ | 18.5 | 20.0 | 22.2 | 22.2 | 22.2 | 18.5 | 22.0 |
| $Na_2O$ | 10.5 | 10.0 | 9.1 | 8.0 | 9.2 | 10.5 | 9.2 |
| $K_2O$ | 1.0 | 0 | 0 | 0 | 0 | 1.0 | 1.6 |
| $Li_2O$ | 0 | 0 | 1.4 | 1.4 | 1.4 | 0 | 1.4 |
| Ag | 0.54 | 0.12 | 0.37 | 0.38 | 0.1 | 0.24 | 0.37 |
| CdO | 0.8 | 0.6 | 2.1 | 2.7 | 2.2 | 0.8 | 2.4 |
| CuO | .072 | .03 | 0.37 | 0.37 | 0.37 | 0.06 | 0.37 |
| F | 1.0 | 1.35 | 1.3 | 1.4 | 1.4 | 1.0 | 1.4 |
| Cl | 2.0 | 1.0 | 2.9 | 2.9 | 2.9 | .9 | 2.0 |
| Br | 0 | 0 | 0 | 0 | 0 | 1.0 | 0 |

|  | 8 | 9 | 10 | 11 | 12 | 13 | 14 |
|---|---|---|---|---|---|---|---|
| $SiO_2$ | 55.2 | 54.4 | 54.4 | 54.4 | 60.1 | 54.4 | 55.0 |
| $Al_2O_3$ | 9.1 | 9.2 | 9.2 | 9.2 | 18.5 | 9.2 | 9.2 |

TABLE I-continued

| $B_2O_3$ | 22.0 | 22.0 | 22.0 | 22.0 | 9.5 | 22.0 | 22.0 |
|---|---|---|---|---|---|---|---|
| $Na_2O$ | 9.1 | 8.2 | 8.2 | 8.2 | 10.5 | 8.2 | 9.2 |
| $K_2O$ | 0 | 1.65 | 1.65 | 1.65 | 1.0 | 1.65 | 0 |
| $Li_2O$ | 1.4 | 1.4 | 1.4 | 1.4 | — | 1.4 | 1.4 |
| Ag | 0.39 | 0.37 | 0.37 | 0.37 | 0.54 | 0.37 | 0.39 |
| CdO | 2.8 | 2.4 | 2.4 | 2.4 | 1.5 | 2.4 | 2.2 |
| CuO | 0.48 | 0.39 | 0.39 | 0.39 | .10 | 0.39 | 0.37 |
| F | 1.4 | 1.4 | 1.4 | 1.4 | 1.0 | 1.4 | 1.4 |
| Cl | 2.9 | 2.9 | 2.9 | 2.9 | 3.0 | 2.9 | 2.9 |
| $WO_3$ | 0 | 1.95 | 0 | 0 | — | 0 | 0 |
| $La_2O_3$ | 0 | 0 | 0.99 | 0 | — | 0 | 0 |
| $Ta_2O_5$ | 0 | 0 | 0 | 2.0 | — | 0 | 0 |

Compositions such as shown in Table I above may be compounded utilizing conventional glass batch constituents. The batches may be ball-milled to assure a homogeneous melt. Glass articles may then be formed from the batches by melting at 1200°–1500° C. for 2–4 hours, and casting the melts into steel molds to form glass bars about 8 inches long, 4 inches wide, and 6–8 mm. thick. These bars may be annealed at 525° C. for 1 hour followed by slow cooling.

Glass bars produced as described may not be photochromic as formed, but photochromic properties are readily developed therein by heat treatment at temperatures between the softening point and the annealing point of the glass. Table II below sets forth some specific schedules, including peak heat treating temperatures and treatment times, which may be used to develop photochromic properties in glasses having compositions such as shown in Table I above.

TABLE II

| Schedule Number | Peak Treating Temperature | Treating Time |
|---|---|---|
| I | 620° C. | 30 minutes |
| II | 610° C. | 30 minutes |
| III | 550° C. | 10 minutes; then |
|  | 635° C. | 20 minutes |
| IV | 575° C. | 60 minutes |
| V | 640° C. | 20 minutes |

In the course of the heat treatment of the described glass compositions according to heat treatments such as shown in Table II, a phase separation occurs during which a multiplicity of second-phase droplets ranging about 300–1000A in size precipitate in the glass. These droplets apparently serve as nucleation and growth sites for a particulate third phase which forms in or on the droplet phase. The particles constituting this third phase are of an average size falling within the range of about 20–50A.

The nature of these separated phases is shown in FIG. 1 of the drawing. This figure is a transmission electron photomicrograph taken through a thin, fractured-edge region of a glass article having a composition approximating that of Example 14 of Table I, after heat treatment according to schedule IV shown in Table II. The droplet phase and the smaller particulate phase associated therewith are readily identified. From the white micron reference bar, the average size of the separated particles in the droplets is estimated to be about 30A. The photochromic constituents of the glass are believed to reside in these separated phases, quite probably in the smaller separated particles.

The photochromic properties of glasses produced as above described may be evaluated in accordance with conventional practice by measuring the transmittance of the glass in the undarkened state, exposing the glass to a source of ultraviolet light for a specified time to obtain photochromic darkening, measuring the darkened transmittance of the glass, and finally allowing the glass to fade in the absence of light or in the presence of long-wave-length bleaching radiation to determine the faded and bleached transmittances thereof.

Table III below sets forth typical photochromic properties data with respect to glasses having compositions such as shown in Table I. The data is obtained by testing glass samples 4 mm in thickness which are heat treated as shown in Table II. Included in Table III are the glass number from Table I, the heat treatment utilized, if any, from Table II, the transmittance of each glass in the clear state ($T_o$), the transmittance of each glass in the darkened state ($T_D$), and the transmittance of each glass after a 5 minute fading interval in the absence of light ($T_F$).

The darkened state reported in Table III is induced by exposure of the glass to two 15-watt black-light blue fluorescent lamps for a time interval of about 5 minutes. None of the glasses shown have a green coloration in the darkened state; rather all have darkened colors ranging from red-brown to purple-gray.

TABLE III

| Glass Composition | 1 | 2 | 3 | 4 | 5 | 6 | 7 |
|---|---|---|---|---|---|---|---|
| Heat Treatment | III | II | I | None | V | II | None |
| $T_o$ | 92 | 87 | 88 | 85 | 89.5 | 92 | 85.4 |
| $T_D$ | 9.5 | 12 | 23 | 35 | 47.5 | 43 | 15.6 |
| $T_F$ | 26.5 | 26 | 43 | 59 | 63.5 | 69 | 38.3 |

| Glass Composition | 8 | 9 | 10 | 11 | 12 | 13 | 14 |
|---|---|---|---|---|---|---|---|
| Heat Treatment | None | None | None | None | II | I | IV |
| $T_o$ | 87 | 67.3 | 87.5 | 79.5 | 92.5 | 83.8 | 84 |
| $T_D$ | 45 | 17.6 | 29 | 17.1 | 25.0 | 19.1 | 24 |
| $T_F$ | 65 | 32.5 | 48 | 32.2 | 50.0 | 36.7 | 43 |

Figure 2:
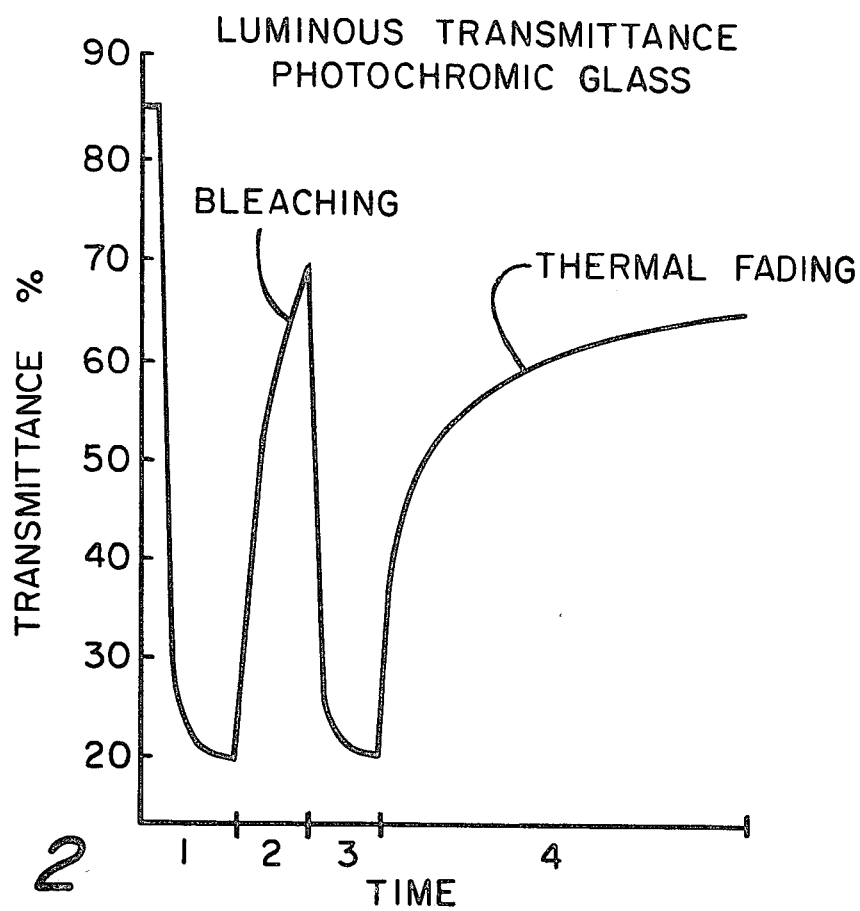
FIG. 2 schematically illustrates the transmittance of a typical photochromic glass article provided in accordance with the invention, measured over a time interval wherein the glass is sequentially exposed to darkening, bleaching and darkening radiation, and thereafter permitted to fade in the absence of light.

The darkening, bleaching and fading characteristics of glasses provided in accordance with the invention are schematically illustrated in FIG. 2 of the drawing, which shows the transmittance of a typical glass as it is cycled through a process comprising darkening, bleaching, redarkening and thermal fading processes.

Referring specifically to FIG. 2, time interval 1 of the process represents an interval wherein the glass is darkened from a transmittance of about 86% to a transmittance of about 20% at a rate corresponding to that which would be provided by exposure to a strong source of white light, such as a xenon arc. At the end of interval 1, irradiation with white light is terminated and irradiation with a strong source of red bleaching light is commenced. The irradiation is continued throughout time interval 2, during which the glass is bleached from a transmittance of about 20% to a transmittance of about 70%.

At the end of time interval 2, irradiation with red light is terminated and irradiation with white light is again commenced to darken the glass. This irradiation is continued throughout interval 3, during which the transmittance of the glass is again reduced to about 20%.

At the end of interval 3, irradiation with white light is terminated and the glass is permitted to fade in the absence of visible light during longer time interval 4. This fading, termed thermal fading, occurs at a rate such that the glass reaches a transmittance of about 65% in interval 4.

This figure illustrates the fact that, over an equivalent time interval, the glasses of the invention exhibit faster recovery to a given level of transmittance in the presence of bleaching radiation than in the absence thereof. This property of optical bleaching is not typical of copper-cadmium halide glasses and represents an essential feature of the glasses of the invention.

Figure 3:
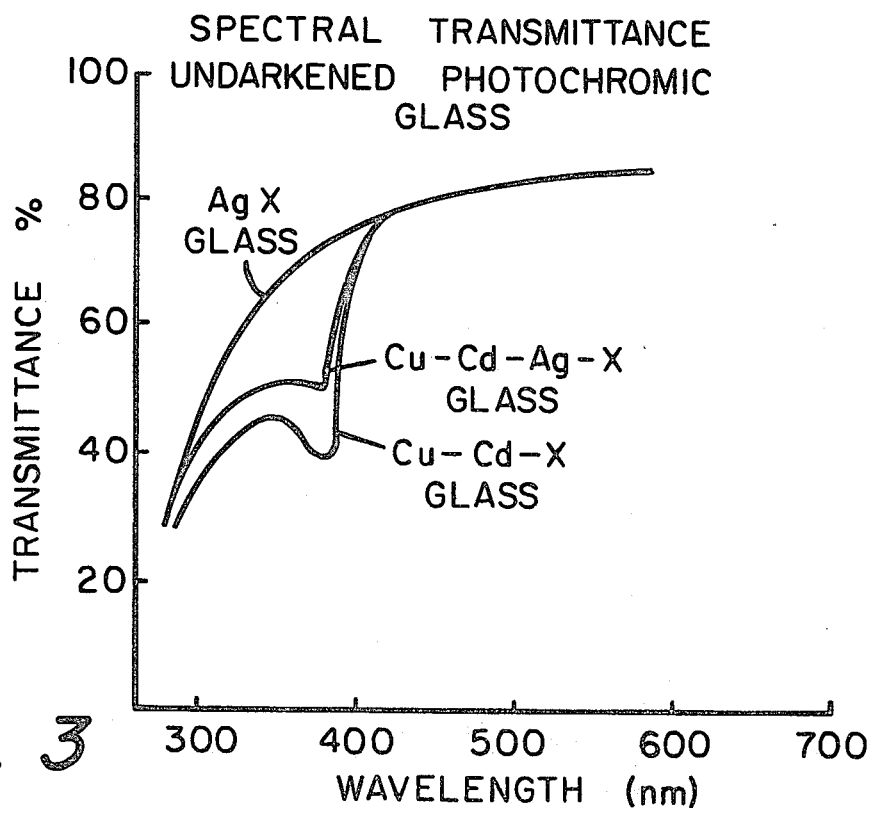
FIG. 3 is a schematic illustration of the transmittance of three undarkened photochromic glasses as a function of the wavelength of the incident light, wherein two of the three glasses exhibit a 370 nm absorption peak which is generally characteristic of copper-cadmium halide photochromic glasses. The third glass comprises only a silver halide phase, and does not exhibit this absorption.

The surface darkening characteristic of the glasses of the invention is attributed in part to the ultraviolet absorption behavior of the separated photochromic phase. This behavior is schematically illustrated in FIG. 3 of the drawing, which is plot of the transmittance of three different photochromic glasses as a function of the wavelength of the incident light. All of the glasses are in the undarkened state, the ultraviolet absorption behavior of each glass being due only to the unactivated photochromic phase and to the matrix glass.

The glass designated 'AgX Glass' is a conventional photochromic glass of the silver halide type. The monotonically decreasing transmittance of this glass over the 380–280 nm wavelength range is attributable principally to the changing silver halide absorption and the opacity of the silicate glass matrix with respect to the incident light. The glass designated 'Cu-Cd-X Glass' is a conventional photochromic glass of the copper-cadmium halide type. Unlike the silver halide glass, this glass exhibits an absorption inflection forming a strong ultraviolet absorption peak at 370 nm, which we attribute to the presence of copper in a cadmium chloride environment.

The glass designated 'Cu-Cd-Ag-X Glass' is a glass according to the invention, also exhibiting an absorption peak at 370 nm, which is analogous to that of a copper-cadmium halide glass. Strong 370 nm absorption is characteristic of surface darkening glass of this type. For the purpose of the present description, a surface darkening glass is a glass wherein darkening upon prolonged exposure to a light source comprising ultraviolet radiation of an intensity approximating sunlight is largely limited to a relatively thin surface layer (e.g. 10 mils) of the darkened glass. Our glasses exhibit this property.

In certain glasses provided in accordance with the invention the presence of an absorption peak at 370 nm may be masked by the presence of absorbing constituents such as colorants or silver metal which broadly increase the absorption throughout the ultraviolet range. Even in that case, however, an absorption inflection at 370 nm, manifested by an inflection in the spectral absorption curve for the glass at that wavelength, can be identified.

Provided that adequate heat treatments are employed to fully develop the photochromic phase, we have found that the intensity of the absorption peak exhibited by our glasses is roughly proportional to the concentration of CdO in the glass composition. Insufficient CdO results in the reduction or disappearance of the 370 nm absorption peak, accompanied by a loss of the surface darkening characteristics of the glass. Relatively high CdO levels, particularly if combined with optimum heat treatments, produce glasses exhibiting very strong 370 nm absorption, essentially equivalent to that of copper-cadmium halide glasses. The use of at least about 0.4% CdO in the glass composition is specified to insure that adequate ultraviolet light absorption can be induced on heat treatment.

From the foregoing description and drawings it can be seen that photochromic glasses provided in accordance with the invention, heat treated to exhibit the characteristic 370 nm absorption inflection, can combine surface darkening and optical bleaching properties in a single glass article. Moreover, glasses exhibiting non-green darkened colors such as red, purple, brown, and mixtures thereof may be provided. Glass compositions which are particularly preferred for the production of such articles consist essentially, in weight percent on the oxide basis, as calculated from the batch of about 50-61% $SiO_2$, 8-19% $Al_2O_3$, 9-23% $B_2O_3$, 2-11% $Na_2O$, 0-4% $Li_2O$, 0-3% $K_2O$, 5-15% total of $Na_2O$ + $K_2O$ + $Li_2O$, 0.03-0.6% Ag, 0.6-3.0% CdO, 0.06-0.5% CuO, 0.9-3.0% Cl, 0-1% Br, and 0.5-1.5% F.

We claim:

1. A photochromic glass article comprising a body of a silicate glass having in at least a portion thereof a separated photochromic phase including second phase droplets 300-1000A in size containing third phase particles 20-50A in size, said separated phase containing copper, cadmium, silver, and at least one halogen selected from the group consisting of chlorine, bromine and iodine, said silicate glass having a composition which comprises, in weight percent as calculated from the batch, about 40-75% $SiO_2$, 4-26% $Al_2O_3$, 4-26% $B_2O_3$, 2-30% total of alkali metal oxides selected in amounts not exceeding the indicated proportions from the group consisting of up to 8% $Li_2O$, up to 15% $Na_2O$, up to 20% $K_2O$, up to 25% $Rb_2O$, and up to 30% $Cs_2O$, at least about 0.01% Ag, 0.03% CuO, 0.4% CdO, and 0.3% total of halogens selected from the group consisting of chlorine, bromine and iodine, and said glass exhibiting an absorption inflection at 370 nm and both optical bleaching and surface darkening properties.

2. A composition for a photochromic glass consisting essentially, in weight percent on the oxide basis, as calculated from the batch of about 40-75% $SiO_2$, 4-26% $Al_2O_3$, 4-26% $B_2O_3$, 2-30% total of alkali metal oxides selected in amounts not exceeding the indicated proportions from the group consisting of up to 8% $Li_2O$, up to 15% $Na_2O$, up to 20% $K_2O$, up to 25% $Rb_2O$ and up to 30% $Cs_2O$, 0.03-0.7% CuO, 0.4-5% CdO, 0.03-0.7% Ag, 0-2% F, and 0.3-3% total of halogens selected from the group consisting of Cl, Br and I.

3. A composition in accordance with claim 2 which consists essentially, in weight percent on the oxide basis, as calculated from the batch of about 50-61% $SiO_2$, 8-19% $Al_2O_3$, 9-23% $B_2O_3$, 2-11% $Na_2O$, 0-4% $Li_2O$, 0-3% $K_2O$, 5-15% total of $Na_2O$ + $K_2O$ + $Li_2O$, 0.03-0.6% Ag, 0.6-3.0% CdO, 0.06-0.5% CuO, 0.9-3.0% Cl, 0-1% Br and 0.5-1.5% F.

* * * * *